US008856961B2

(12) United States Patent
Ketola

(10) Patent No.: US 8,856,961 B2
(45) Date of Patent: Oct. 7, 2014

(54) PROCESSING COPYRIGHT NOTICE OF MEDIA FILE

(75) Inventor: Pekka Ketola, Tampere (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 1089 days.

(21) Appl. No.: 11/664,474

(22) PCT Filed: Sep. 29, 2005

(86) PCT No.: PCT/FI2005/050337
§ 371 (c)(1),
(2), (4) Date: Mar. 30, 2007

(87) PCT Pub. No.: WO2006/037855
PCT Pub. Date: Apr. 13, 2006

(65) Prior Publication Data
US 2008/0066194 A1    Mar. 13, 2008

(30) Foreign Application Priority Data
Oct. 1, 2004 (FI) .................................. 20045367

(51) Int. Cl.
G06F 21/00 (2013.01)
H04L 29/06 (2006.01)

(52) U.S. Cl.
CPC ........... *H04L 63/10* (2013.01); *H04L 2463/103* (2013.01); *G06F 21/00* (2013.01); *H04L 2463/101* (2013.01)
USPC ........................................... 726/33; 358/518

(58) Field of Classification Search
CPC ................ H04L 2463/103; H04L 2463/101; H04L 63/10; G06F 21/00
USPC .............................................. 726/33; 358/518
See application file for complete search history.

(56) References Cited

U.S. PATENT DOCUMENTS

| 5,901,224 | A  | * | 5/1999  | Hecht ........................... 713/179 |
| 6,177,957 | B1 | * | 1/2001  | Anderson ................ 348/231.99 |
| 6,553,127 | B1 | * | 4/2003  | Kurowski ...................... 382/100 |
| 6,567,358 | B1 | * | 5/2003  | Komma et al. ............. 369/53.21 |
| 6,813,369 | B2 | * | 11/2004 | Oki ............................... 382/100 |
| 7,388,606 | B2 | * | 6/2008  | Fox et al. ....................... 348/239 |
| 2001/0026629 | A1 | * | 10/2001 | Oki ............................... 382/100 |
| 2001/0051930 | A1 | * | 12/2001 | Nakamura ...................... 705/56 |
| 2002/0065955 | A1 |   | 5/2002  | Gvily |
| 2002/0157013 | A1 | * | 10/2002 | Masaki et al. ................ 713/193 |
| 2003/0120927 | A1 |   | 6/2003  | Kim et al. |
| 2003/0191941 | A1 | * | 10/2003 | Terada et al. ................. 713/176 |
| 2003/0210803 | A1 | * | 11/2003 | Kaneda et al. ................ 382/100 |
| 2004/0002993 | A1 |   | 1/2004  | Toussaint et al. |
| 2004/0128280 | A1 | * | 7/2004  | Gomi et al. ....................... 707/1 |
| 2005/0018843 | A1 | * | 1/2005  | Park .............................. 380/203 |

(Continued)

FOREIGN PATENT DOCUMENTS

EP   1 079 598 A2   2/2001
JP   2001045277 A   2/2001

(Continued)

*Primary Examiner* — Jeffrey Pwu
*Assistant Examiner* — Samuel Ambaye

(57) ABSTRACT

A method for processing the copyright notice of a media file stored in digital format in an electronic device is provided. The copyright notice of the media file is checked during data transmission between two equivalent electronic devices, and if the copyright notice is not found, action is taken to insert the copyright notice.

20 Claims, 3 Drawing Sheets

(56) References Cited

U.S. PATENT DOCUMENTS

2005/0276573 A1* 12/2005 Abbate ............................ 386/52
2006/0158688 A1* 7/2006 Mori ............................ 358/1.15
2007/0002362 A1* 1/2007 Kacker et al. ................. 358/1.14

FOREIGN PATENT DOCUMENTS

| JP | 2002091455 A | 3/2002 |
| JP | 2004193859 A | 7/2004 |
| JP | 2004272522 A | 9/2004 |

* cited by examiner

PROCESSING COPYRIGHT NOTICE OF MEDIA FILE

FIELD

The invention relates to a method, electronic device, and computer program product for processing the copyright notice of a media file and stored in digital format into the electronic device.

BACKGROUND

Along with the popularity of the Internet and the ever-faster telecommunications connections, the transmission of different types of files containing media has also increased. The use of multimedia messages employed in mobile systems has also increased since terminals equipped with a camera and multimedia characteristics have become more common. Due to fact that copying files is easy, illegal copying and editing of files also takes place. If the file does not contain copyright notice, it is difficult to protect the copyrights.

There are several methods for inserting copyright notice into a file. Examples of these are inserting a copyright marking into the file in such a manner that it is visible when the file is opened, a digital signature, and a digital watermark. In the first case, copyright notice can be inserted into an audio file, for instance, as metadata in such a manner that when the audio file is reproduced, the application used for reproduction also displays the copyright notice on the user interface of the application.

A digital signature is part of the Public Key Infrastructure that uses a third party to verify the identities of two communicating parties. When creating a digital signature, the signer calculates from the information to be signed a hash by using a one-way function, and encrypts it with his private key. The recipient also calculates a hash from the received information and compares it with the encrypted hash he has opened with the public key of the signer. If the hashes are identical, the information has been signed by the person whose public key was used to open the encrypted hash.

When using a digital watermark, copyright notice is inserted into the digital-format media file as extra hashed bits in such a manner that the copyright notice is only displayed with an application suitable for reading a digital watermark. In a conventional image processing application, the extra bits are displayed as noise.

However, the creator of the media file often does not insert copyright notice. For instance, copyright notice is not very often inserted into photographs taken by a private individual. Files containing media are often transmitted without copyright notice for instance by electronic mail or multimedia messages to several persons, and several copies may be produced of them. The copying and editing of files containing media may even lead to copyright infringements.

BRIEF DESCRIPTION

It is an object of the invention to provide improved methods for processing the copyright notice of a media file, improved electronic devices for processing the copyright notice of a media file, and improved computer program products that encode computer processes for processing the copyright notice of a media file.

As one aspect of the invention, a method is disclosed for processing the copyright notice of a media file transferred between two equivalent electronic devices, the media file being received and stored in digital format into a first electronic device, the method comprising: checking, upon reception of the media file from a second electronic device equivalent to the first electronic device, the copyright notice of the media file, and taking action to insert the copyright notice, if the copyright notice is not found.

As one aspect of the invention, a method is disclosed for processing the copyright notice of a media file to be transferred between two equivalent electronic devices, the media file being stored in digital format into a first electronic device, the method comprising: checking the copyright notice of the media file to be transmitted to a second electronic device equivalent to the first electronic device, and taking action to insert the copyright notice, if the copyright notice is not found.

As one aspect of the invention, an electronic device is disclosed, the electronic device comprising a receiver that is configured to receive media files from another equivalent electronic device, a processing unit connected to the receiver and configured to process received information, a memory unit connected to the processing unit for storing information, and a user interface connected to the processing unit for interaction between the electronic device and a user. The processing unit is also configured to check, upon reception of a media file from the other equivalent electronic device, the copyright notice of the media file, and take action to insert the copyright notice, if the copyright notice is not found.

As one aspect of the invention, an electronic device is disclosed, the device comprising a transmitter configured to transmit media files to another equivalent electronic device, a processing unit connected to the transmitter and configured to process information to be transmitted, a memory unit connected to the processing unit for storing information, and a user interface connected to the processing unit for interaction between the electronic device and a user. The processing unit is also configured to check the copyright notice of a media file to be transmitted to the other equivalent electronic device, and take action to insert the copyright notice, if the copyright notice is not found.

As one aspect of the invention, an electronic device is disclosed, the device comprising means for receiving and processing a media file received from another equivalent electronic device. The electronic device also comprises means for checking, upon reception of the media file from the other equivalent electronic device, the copyright notice of a media file, and means for taking action to insert the copyright notice if the copyright notice is not found.

As one aspect of the invention, an electronic device is disclosed, the device comprising means for processing and transmitting files containing media to another equivalent electronic device. The electronic device also comprises means for checking the copyright notice of a media file to be transmitted to the other equivalent electronic device, and means for taking action to insert the copyright notice if it is not found.

As one aspect of the invention, a computer program product is disclosed, the product encoding a computer process for processing the copyright notice of a media file transferred between two equivalent electronic devices, the media file being stored in digital format into a first electronic device, the computer process comprising: checking, upon reception of the media file from a second electronic device equivalent to the first electronic device, the copyright notice of the media file, and taking action to insert the copyright notice, if the copyright notice is not found.

As one aspect of the invention, a computer program product is disclosed, the product computer program product encoding a computer process for processing the copyright notice of a file to be transferred between two equivalent electronic devices, the media file being stored in digital format into a first electronic device, the process comprising: checking the copyright notice of the media file to be transmitted to a second electronic device equivalent to the first electronic device, and taking action to insert the copyright notice, if the copyright notice is not found.

Preferred embodiments of the invention are described in the dependent claims.

The methods, electronic devices, and software products of the invention provide several advantages. The method according to the embodiment ensures that copyright notice is inserted into a media file, which has been transferred between two equivalent electronic devices. The method does not necessarily require any action from the user or any technical know-how to insert the copyright notice, which increases user-friendliness. The method also decreases the number of files containing media without copyright notice, which are transmitted from one user to another, especially in environments where inserting the copyright notice has not been common. An example of this is transmitting photographs taken with mobile stations equipped with cameras from one person to another. Search functions performed on the basis of the copyright notice of a file also become better in environments of this type.

LIST OF FIGURES

The invention will now be described in more detail by means of the preferred embodiments and with reference to the attached drawings, in which FIG. 1 is a block diagram illustrating an embodiment of an electronic device;

DESCRIPTION OF EMBODIMENTS

Figure 1:
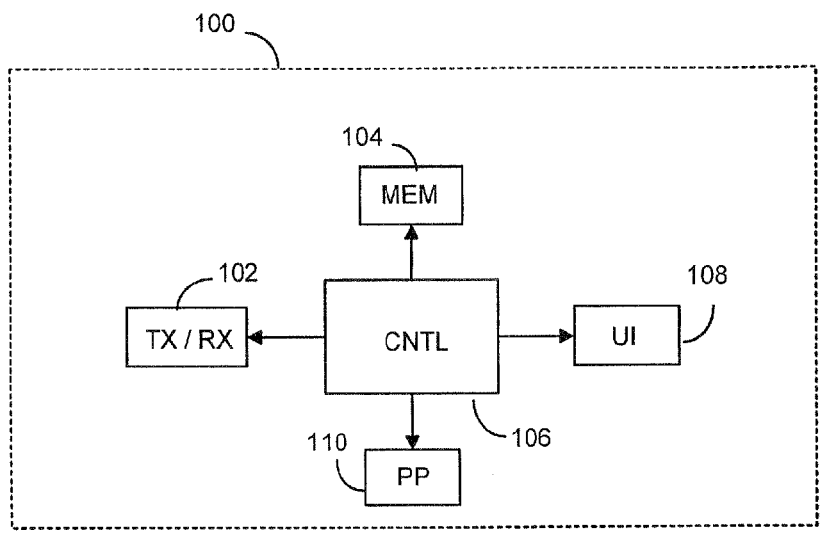

The structure of an electronic device 100 configured to process the copyright notice of files containing media is described with reference to FIG. 1. The electronic device 100 can be a computer, mobile system subscriber terminal, PDA (Personal Digital Assistant), or a corresponding device suitable for data processing. The electronic device can also comprise two inter-connected electronic devices, such as a mobile phone connected to a computer.

The electronic device 100 comprises a data transmission unit 102 that comprises means for transmitting data between the electronic device 100 and other electronic devices. The data transmission can take place through a GSM (Global System for Mobile Communications), GPRS (General Packet Radio Service), or UMTS (Universal Mobile Telecommunications System) mobile system, or the like. The data transmission system can also be some other wireless data transmission system, such as a Bluetooth®, IrDA (Infrared Data Association), or WLAN (Wireless Local Area Network) system. The data communications system can even be a fixed line system, such as a DSL (Digital Subscriber Line) system, or an Ethernet local area network. The electronic device can comprise means for only transmitting or receiving data, or means for both transmission and reception.

The electronic device 100 also comprises a processing unit 106 that controls and monitors the functions of the electronic device 100, such as the processing of information stored in the electronic device 100 and the management of user interface 108 parts. The processing unit 106 is today generally implemented as a digital signal processor (DSP) including the software required to control the electronic device 100. Different hardware implementations—such as ASIC (Application Specific Integrated Circuit)—are also possible.

The electronic device also comprises a user interface 108 connected to the processing unit 106. The user interface 108 can be implemented according to the prior art. The user interface 108 can for instance comprise a keyboard or a corresponding component for controlling the electronic device 100, for entering information and information processing commands. The user interface 108 can also comprise a display for displaying information. The user interface 108 can also be a touch screen.

The electronic device 100 also comprises a memory 104 connected to the processing unit 106 for storing information. The memory 104 can be a non-volatile memory implemented in a known manner, for instance a memory circuit or hard disk, or a memory unit serving as a temporary memory.

The electronic device 100 can also comprise peripheral devices 110, such as a camera and microphone, for creating files containing media, for instance. Files containing media refer in this context to files that may contain still images, moving images, sound, or text, for example. A media file can also be a multimedia file containing several of the above-mentioned media types.

Figure 2:
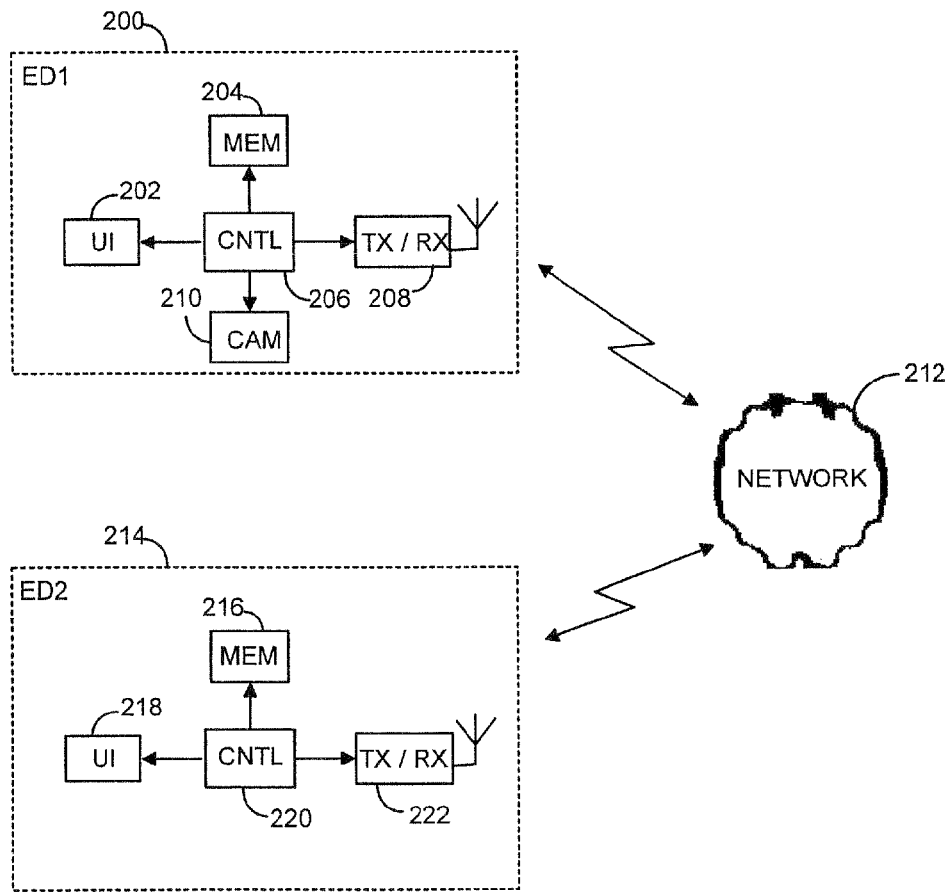
FIG. 2 illustrates the processing of information containing media during data transmission.

The following describes examples of embodiments for processing the copyright notice of a media file during data transmission with reference to FIG. 2, according to which a first electronic device 200 comprises a transceiver 208, memory 204, camera 210, and user interface 202 connected to a processing unit 206. A second electronic device 214 comprises a transceiver 222, user interface 218, and memory 216 connected to a processing unit 220. The first and second electronic devices 200, 214 are inter-connected over a data transmission network 212. The data transmission network 212 can comprise one or more of the above-mentioned, inter-connected data transmission systems.

Let us examine as an example the taking of a photograph and the processing of the copyright notice of the photograph when the photograph is transmitted from the first electronic device 200 to the second electronic device 214. Even though the example describes the processing of the copyright notice of a photograph, the method is also applicable to the processing of the copyright notice of other type of media (sound, text, and multimedia).

The camera 210 connected to the first electronic device 200 is used to take a photograph. The photograph is stored as an image file in digital format into the memory 204 in the electronic device 200. After this, the user of the electronic device 200 wants to transmit the photograph he has taken to another person over a data transmission network.

According to a first embodiment, before the image file is transmitted, the first electronic device 200 executes a software application, controlled by which the processing unit 206 checks whether copyright notice is inserted into the image file. The execution of the software application checking the copyright notice can for instance be triggered by marking the image file as a file to be transmitted, or by the storage of the image file into a mass memory, to which other users have read access.

If the copyright notice is found in the image file, this can be notified to the user with an image or sound. The copyright notice can also be displayed to the user on the display of the electronic device 200. The notification on finding the copyright notice can also be left out.

If no copyright notice is found, the copyright notice of the user of the electronic device 200 can be inserted automatically to the image file. The copyright notice can for instance be taken from the user information in the electronic device 200. The copyright notice of a media file can for instance include the name and contact information of the creator of the file, a copyright notification, and the time the file was created. The copyright notice can be inserted using existing art, such as a digital watermark, digital signature, or a corresponding method. The copyright notice can also be inserted as text, if the file format allows it. The insertion of the copyright notice can be indicated to the user by an image or sound, for instance, on the user interface 202 of the electronic device 200.

Instead of inserting the copyright notice automatically, the user can be given alternatives for the possible actions related to inserting the copyright notice, if the copyright notice is not found in the image file. Possible actions include inserting the information of the user of the electronic device 200 as the copyright notice, inserting copyright notice selected by the user of the electronic device 200, and not inserting any copyright notice. If the user selects not to insert any copyright notice, it is possible to prevent the transmission of the image file. This way, the image file cannot be transmitted from one user to another without any copyright notice.

After the copyright notice is inserted, the image file is transmitted to the second electronic device 214. The second electronic device 214 can be any one of the above-mentioned electronic devices, but also a server, the mass memory of which is shared by several users. The image file can be transmitted as part of a larger entity, such as an attachment to an email, or it can be transmitted as such, for instance as a multimedia message.

According to a second embodiment, the second electronic device 214 receives from the first electronic device 200 a media file. In this context, reception also refers to a situation, in which the user of the second electronic device 214 transfers the media file from the first electronic device 200. During reception, the second electronic device 214 executes a software application, controlled by which the processing unit 220 checks whether the copyright notice of the image is inserted in the media file. The execution of the software application checking the copyright notice can for instance be triggered by the initiation of the processing of the received media file. The processing of the file refers to opening, storing, or forwarding the file, or a corresponding activation of the file.

If the copyright notice is found in the media file, this can be notified to the user by an image or sound, or by using another known signalling method. The copyright notice can also be displayed to the user on the display of the electronic device 214. This notification on finding the copyright notice can also be left out.

If no copyright notice is found, the copyright notice of the sender can be inserted automatically into the media file. The copyright notice can for instance be taken from the transmission identifier attached to the received information, the identifier comprising the name, telephone number, or email address of the sender, for instance. If the user of the second electronic device 214 has himself transmitted the media file, the identifier of the location from which the media file was transmitted can be used as the copyright notice. This type of identifier can be the URL (Uniform Resource Locator) address of an Internet site.

If there is no copyright notice in the received information, from which to identify the sender of the data, and the creator of the media file cannot be found out by any other means, it is possible to insert 'unknown' as the copyright notice of the media file. In a case where it is not possible to find out the creator of the media file, the file can also be destroyed automatically to avoid copyright infringement.

As the description of the two embodiments of the invention indicates, the media file is transferred between two equivalent or corresponding electronic devices 200, 214. For example, the media file may be transmitted from a PDA to another PDA or from a PDA to a mobile system subscriber terminal. Thus, both electronic devices 200, 214 may be independent devices operated by a different user. The copyright notice of a media file can include the name and contact information of the creator of the file, a copyright notification, and the time the file was created. The copyright notice can be inserted using existing art, such as a digital watermark, digital signature, or a corresponding method. The copyright notice can also be inserted as text, if the file format allows it. The insertion of the copyright notice can be indicated to the user by an image or sound on the user interface 218 of the electronic device 214.

Instead of inserting the copyright notice automatically, the user can be given alternatives for the possible actions related to inserting the copyright notice, if the copyright notice is not found in the media file. Possible actions include inserting the information of the sender of the file as the copyright notice, inserting copyright notice selected by the user of the electronic device 214, and not inserting any copyright notice. If the user selects not to insert any copyright notice, the media file can be destroyed.

If copies are made of a received media file, the copyright notice is also inserted into the copies. Even when only part of the received original media file is used to create a file, the copyright notice of the original media file is inserted into the new file. An example of this is a case where a multimedia file containing images, text, and sound is received. If no copyright notice is found in the multimedia file, the copyright notice of the sender is inserted into it. From the multimedia file, a single image is stored into a separate file. The copyright notice of the sender of the original multimedia file is also inserted into this image.

Figure 3:
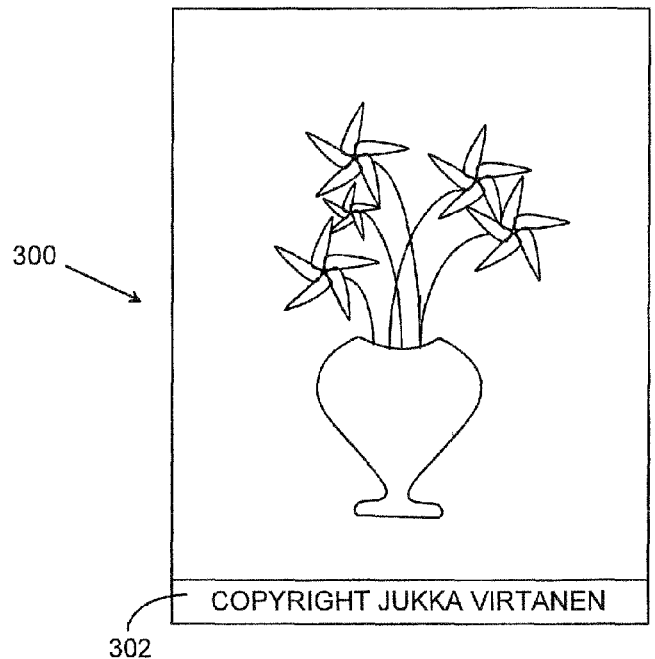
FIG. 3 shows an example of an image having copyright notice added thereto.

FIG. 3 shows an example of an image 300 to which copyright notice 302 is inserted. The copyright notice 302 can be inserted into the image file in such a manner that it is shown on the image 300. In such a case, the image file should be stored in a format that allows adding text to the image file. An example of such a file format is PNG (Portable Network Graphics). The copyright notice can also be inserted using for instance a digital watermark or a digital signature, in which case the copyright notice can be displayed by using an application suitable for reading a digital watermark or signature.

It is also possible to insert copyright notice in an audio file by using a digital watermark or signature. The copyright notice can also be inserted into an audio file as text, if the audio file format allows inserting text into it. An example of such a format is MP3 (MPEG (Motion Pictures Experts Group) Layer 3), into the ID3 tag of which it is possible to insert copyright notice, for example. In such a case, the copyright notice is displayed during reproduction in the user interface of the application used for reproducing the audio file.

In the case of a text file, the copyright notice can be inserted for instance as text into the header of the text file. The digital watermark and signature are also possible methods for inserting the copyright notice.

Figure 4:
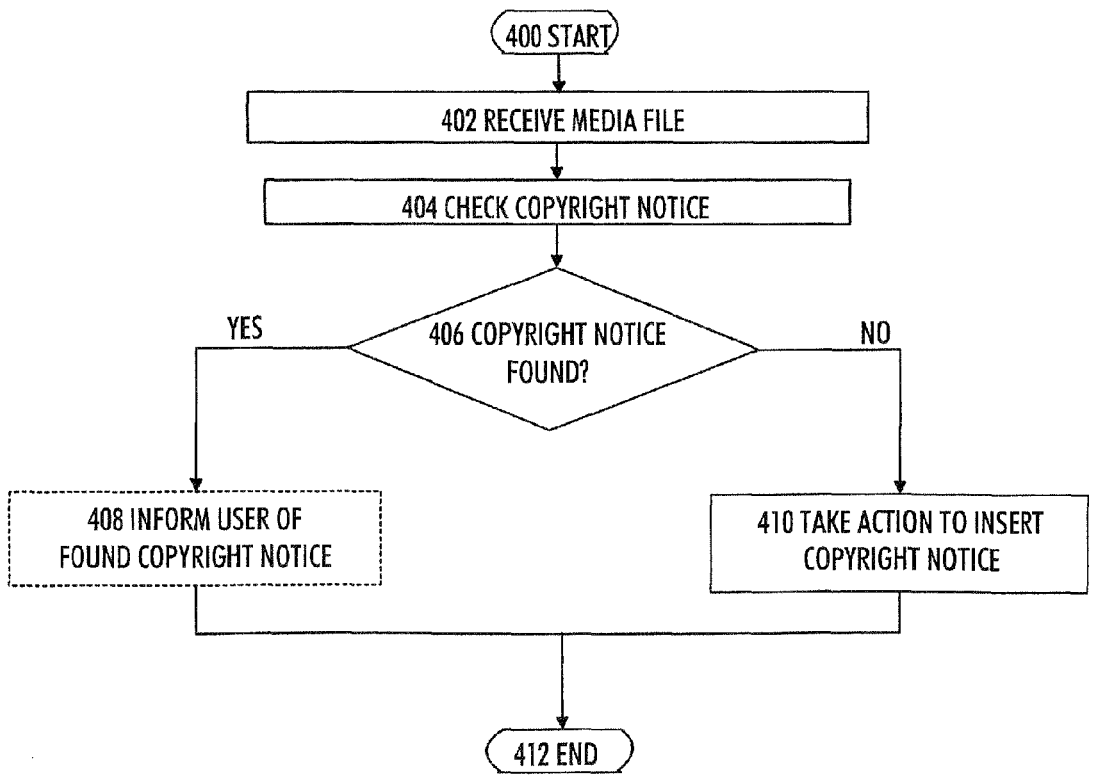
FIG. 4 is a flow chart illustrating an embodiment for inserting copyright notice into a received media file.

The following describes a method for processing the copyright notice of a media file during reception with reference to the flow chart in FIG. 4. The execution of the method is started in step 400. In step 402, a media file is received in an electronic device. The media file can be received as such or it may be part of a larger received entity, such as an attachment to an email.

In step 404, the routine checks whether the media file has copyright notice. If the copyright notice is found in the media file, the routine proceeds from step 406 to 408, in which the user is informed on the user interface of the electronic device by a sound or image, for instance, that the copyright notice was found. The copyright notice inserted into the media file can also be shown to the user. Step 408 is not an obligatory action, but can also be left out as chosen by the user, for instance.

If no copyright notice was found in the media file, the routine moves from step 406 to step 410 to take action to insert the copyright notice. The action may be inserting the copyright notice automatically into the media file or displaying alternatives related to inserting the copyright notice to the user. In the first case, the information of the sender is inserted into the media file as the copyright notice, and the insertion can be notified to the user on the user interface of the electronic device by an image or sound. In the latter case, the possible actions include inserting the information of the sender of the file as the copyright notice, inserting copyright notice selected by the user, and not inserting any copyright notice. The user selects the action to the taken from the alternatives. If the user selects not to insert any copyright notice, the media file can be destroyed. The execution of the method ends in step 412.

Figure 5:
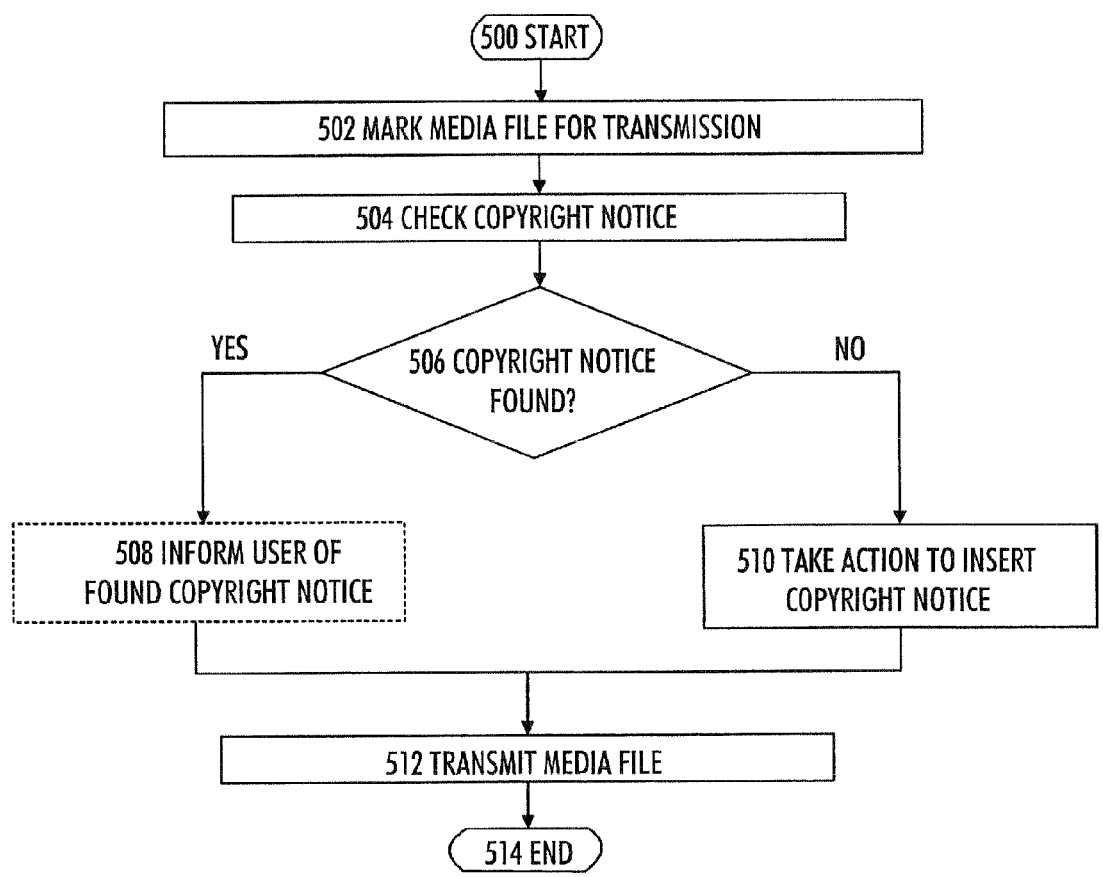
FIG. 5 is a flow chart illustrating an embodiment for inserting copyright notice into a file to be transmitted containing media.

The following describes the processing of the copyright notice of a media file during transmission with reference to FIG. 5. The execution of the method is started in step 500. In step 502, a media file is marked for transmission. As a result of step 502, step 504 is executed to check whether copyright notice is inserted into the media file. If the copyright notice is found from the media file, the routine moves from step 506 to step 508, in which the user is informed on the user interface of the electronic device by an image or sound that the copyright notice was found. The copyright notice inserted into the media file can also be displayed to the user. Step 508 is not obligatory and can be left out as chosen by the user, for instance.

If no copyright notice was found in the media file, the routine moves from step 506 to step 510 in which action is taken to insert the copyright notice. The action may be inserting the copyright notice automatically into the media file or displaying alternatives related to inserting the copyright notice to the user. In the first case, the information of the user of the electronic device is inserted into the media file as the copyright notice, and the insertion can be notified to the user on the user interface of the electronic device by an image or sound. In the latter case, alternatives for the possible actions include inserting the information of the user of the electronic device as the copyright notice, inserting copyright notice selected by the user, and not inserting any copyright notice. The user selects the action to the taken from the alternatives. If the user selects not to insert any copyright notice, the transmission of the media file can be stopped. The media file is transmitted in step 512. The execution of the method ends in step 514.

The electronic device of the type described above may be used for implementing the method, but also other types of electronic devices may be suitable for the implementation. In an embodiment, a computer program product encodes a computer program of instructions for executing a computer process of the above-described methods for processing the copyright notice of a media file. The computer program product may be implemented on a computer program distribution medium. The computer program distribution medium includes all manners known in the art for distributing software, such as a computer readable medium, a program storage medium, a record medium, a computer readable memory, a computer readable software distribution package, a computer readable signal, a computer readable telecommunication signal, and a computer readable compressed software package.

Even though the invention has been described above with reference to examples according to the attached drawings, it is clear that the invention is not limited to them, but can be modified in many ways within the scope of the attached claims.

The invention claimed is:

1. A method comprising:
   receiving, at a first electronic device operated by a first user, a media file from a second electronic device, operated by a second user, equivalent to the first electronic device;
   storing the media file in a digital format on the first electronic device;
   checking, upon reception of the media file from the second electronic device, a copyright notice of the media file; and
   taking an action associated with the second user's copyright notice of the media file if the copyright notice is not found, wherein the action comprises:
   notifying the lack of copyright notice to the first user on a user interface of the first electronic device;
   providing the first user with a menu of one or more actions relating to the processing of the copyright notice of the media file, wherein the menu of one or more actions comprises at least one of the following:
   inserting into the media file the copyright notice of the second user;
   inserting into the media file the copyright notice selected by the first user; and
   leaving the copyright notice out of the media file; and
   performing the one or more actions based on input received from the first user.

2. A method as claimed in claim 1, wherein the alternatives relating to the processing of the copyright notice of the media file comprises destroying the media file, if the copyright notice is not inserted into the file.

3. A method as claimed in claim 1, wherein if copyright notice is found in the media file, the first user is informed of the finding of the copyright notice on the user interface of the electronic device.

4. A method comprising:
   facilitating user selection of a media file stored in a digital format on a first electronic device to be transmitted to a second electronic device equivalent to the first electronic device;
   checking a copyright notice of the media file in response to selecting the media file for transmission;
   taking an action associated with the copyright notice if the copyright notice is not found, wherein the action comprises at least one of:

notifying the lack of copyright notice on a user interface of the first electronic device; and providing a menu, the menu comprising one or more actions relating to the processing of the copyright notice of the media file, wherein the one or more actions relating to the processing of the copyright notice of the media file comprises at least one of the following:

inserting into the media file a copyright notice of a sender of the media file;

inserting into the media file a copyright notice selected by a user of the first electronic device; and leaving a copyright notice out of the media file; and preventing the transmission of the media file, if the copyright notice is not inserted into the media file.

5. A method as claimed in claim 4, wherein the action to insert the copyright notice comprises inserting into the media file the copyright notice of the user of the first electronic device prior to transmitting the media file.

6. A method as claimed in claim 4, wherein if copyright notice is found in the media file, the user is informed of the finding of the copyright notice on the user interface of the first electronic device.

7. An electronic device comprising:
a receiver that is configured to receive media files from another equivalent electronic device operated by a second user that is different than a user of the electronic device;
a processing unit connected to the receiver and configured to process received information;
a memory unit connected to the processing unit for storing information; and
a user interface connected to the processing unit for interaction between the electronic device and the user;
wherein the processing unit is also configured to cause the electronic device to:
check, upon reception of a media file from the other equivalent electronic device, a copyright notice of the media file;
take an action associated with a sender's copyright notice of the media file if the copyright notice is not found, wherein the action comprises:
notify the lack of the copyright notice to the user on the user interface of the electronic device; and
provide the user with a menu, the menu comprising one or more actions relating to processing of the copyright notice of the media file, wherein the processing unit is, according to the action taken by the user, further configured to take one of the following actions:
insert into the media file the copyright notice of the sender;
insert into the media file the copyright notice selected by the user; and
leave the copyright notice out of the media file; and
performing the one or more actions based on input received from the user.

8. An electronic device as claimed in claim 7, wherein the processing unit is also configured to prevent the transmission of the media file if the copyright notice is left out of the media file.

9. An electronic device as claimed in claim 7, wherein the processing unit is also configured to display the copyright notice to the user on the user interface of the electronic device, if the copyright notice is found in the media file.

10. An electronic device comprising:
a transmitter configured to transmit media files to another equivalent electronic device;
a processing unit connected to the transmitter and configured to process information to be transmitted;
a memory unit connected to the processing unit for storing information; and
a user interface connected to the processing unit for interaction between the electronic device and a user, wherein the user interface facilitates user selection of a media file stored in a digital format on the electronic device to be transmitted to the other equivalent electronic device,
wherein the processing unit is also configured to cause the electronic device to:
check a copyright notice of the media file in response to selecting the media file for transmission;
take an action associated with the copyright notice if the copyright notice is not found, wherein the action comprises:
notify the lack of copyright notice to the user on the user interface; and
provide the user with a menu of possible actions relating to processing of the copyright notice of the media file, wherein the processing unit is also configured to take one of the following actions in accordance with the action selected by the user:
insert into the media file the copyright notice of the user of the media file;
insert into the media file the copyright notice selected by the user; and
leave the copyright notice out of the media file; and
prevent the transmission of the media file, if the copyright notice is not inserted into the media file.

11. An electronic device as claimed in claim 10, wherein the processing unit is also configured to insert into the media file the copyright notice of the user of the electronic device if the copyright notice is missing.

12. An electronic device as claimed in claim 10, wherein the processing unit is also configured to display the copyright notice to the user on the user interface of the electronic device if the copyright notice is found in the media file.

13. An electronic device comprising:
means for receiving and processing a media file received from another equivalent electronic device operated by a second user that is different than a user of the electronic device;
means for checking, upon reception of the media file from the other equivalent electronic device, a copyright notice of the media file; and
means for taking an action associated with the copyright notice of the second user of the media file if the copyright notice is not found, wherein the means for taking the action comprises at least one of:
means for notifying the lack of the copyright notice to the user of the electronic device; and
means for providing the user with a menu, the menu comprising one or more actions relating to the processing of the copyright notice of the media file, wherein the menu of actions includes:
inserting into the media file the copyright notice of the second user of the media file;
inserting into the media file the copyright notice selected by the user; and
leaving a copyright notice out of the media file.

14. An electronic device comprising:
means for processing and transmitting files containing media to another equivalent electronic device;

means for facilitating user selection of a media file stored in a digital format on the electronic device to be transmitted to the other equivalent electronic device;

means for checking copyright notice of the media file in response to selecting the media file for transmission;

means for taking an action associated with the copyright notice if the copyright notice is not found, wherein the means for taking the action comprises at least one of:

means for notifying the lack of the copyright notice to a user of the electronic device;

means for providing the user with a menu, the menu comprising one or more possible actions relating to the processing of the copyright notice of the media file, wherein the one or more possible actions includes:

inserting into the media file a copyright notice of the sender of the media file;

inserting into the media file the copyright notice selected by the user; and leaving the copyright notice out of the media file; and means for preventing the transmission of the media file if the copyright notice is not inserted into the media file.

15. A non-transitory computer program storage medium having instructions stored thereon that are executable by a first electronic device for performing at least the following steps:

receiving a media file from a second electronic device, operated by a second user, equivalent to the first electronic device operated by a first user;

storing the media file in a digital format on the first electronic device;

checking, upon reception of the media file from the second electronic device, a copyright notice of the media file; and taking an action associated with second user's copyright notice of the media file if the copyright notice is not found, wherein the action comprises:

notifying the lack of the copyright notice to the first user on a user interface of the first electronic device; and providing the first user with a menu of a one or more actions relating to processing of the copyright notice of the media file, wherein the menu of the one or more actions comprises at least one of the following:

inserting into the media file a copyright notice of the second user;

inserting into the media file a copyright notice selected by the first user; and leaving the copyright notice out of the media file; and performing at least one of the one or more actions based on input received from the first user.

16. A non-transitory computer program storage medium having instructions stored thereon that are executable by a first electronic device for performing at least the following steps:

facilitating user selection of a media file stored in a digital format on the first electronic device to be transmitted to a second electronic device equivalent to the first electronic device;

checking a copyright notice of the media file in response to selecting the media file for transmission;

taking an action associated with the copyright notice, if the copyright notice is not found, wherein the action comprises:

notifying a first user of the first electronic device of the lack of the copyright notice on a user interface of the first electronic device; and providing the first user with a menu of one or more actions relating to the processing of the copyright notice of the media file, wherein the menu of one or more actions comprises at least one of the following:

inserting into the media file the copyright notice of a sender of the media file;

inserting into the media file the copyright notice selected by the first user; and leaving the copyright notice out of the media file; and preventing the transmission of the media file, if the copyright notice is not inserted into the media file.

17. The method of claim 1, further comprising:

determining, if the copyright notice is not found, a transmission identifier associated with the receiving of the media file from the second electronic device; and determining the copyright notice of the sender from the transmission identifier.

18. The electronic device of claim 7, wherein the processing unit is further configured to cause the electronic device to:

determine, if the copyright notice is not found, a transmission identifier associated with the reception of the media file from the second electronic device; and determine the copyright notice of the sender from the transmission identifier.

19. The electronic device of claim 13, further comprising:

means for determining, if the copyright notice is not found, a transmission identifier associated with the reception of the media file from the second electronic device; and means for determining the copyright notice of the second user from the transmission identifier.

20. The non-transitory computer program storage medium of claim 15, wherein the instructions are further executable for performing:

determining, if the copyright notice is not found, a transmission identifier associated with the reception of the media file from the second electronic device; and determining the copyright notice of the second user from the transmission identifier.

* * * * *